United States Patent [19]

Kessick et al.

[11] Patent Number: 4,521,382
[45] Date of Patent: * Jun. 4, 1985

[54] FORMATION OF COKE FROM HEAVY CRUDE OILS IN THE PRESENCE OF CALCIUM CARBONATE

[75] Inventors: Michael A. Kessick; Zacharia M. George; Linda G. Schneider, all of Edmonton, Canada

[73] Assignee: Alberta Research Council, Edmonton, Canada

[*] Notice: The portion of the term of this patent subsequent to Jun. 4, 2002 has been disclaimed.

[21] Appl. No.: 157,938

[22] Filed: Jun. 9, 1980

[30] Foreign Application Priority Data

Jun. 8, 1979 [GB] United Kingdom ............... 7920001

[51] Int. Cl.³ ............................................ C01G 31/00
[52] U.S. Cl. ........................................ 423/68; 208/126; 208/127; 423/150
[58] Field of Search ............... 208/127, 126; 423/63, 423/150, 68

[56] References Cited

U.S. PATENT DOCUMENTS

| | | | |
|---|---|---|---|
| 514,041 | 2/1894 | Schwahn | 75/101 R |
| 2,953,518 | 9/1960 | McKinley et al. | 208/127 |
| 3,300,276 | 1/1967 | Bretschneider et al. | 423/68 |
| 3,707,462 | 12/1972 | Moss | 208/127 |
| 3,915,844 | 10/1975 | Ueda et al. | 208/127 |
| 3,923,635 | 12/1975 | Schulman et al. | 208/127 |
| 4,169,038 | 9/1979 | Metrailer et al. | 208/127 |
| 4,216,197 | 8/1980 | Moss | 423/638 |
| 4,243,639 | 1/1981 | Haas et al. | 423/68 |

Primary Examiner—John Doll
Assistant Examiner—Wayne A. Langel
Attorney, Agent, or Firm—Sim & McBurney

[57] ABSTRACT

The sulphur emissive capability, on combustion, of coke which is formed during upgrading of sulphur-containing heavy crude oils, including oil sands bitumen, and residua, is decreased by the addition of calcium carbonate, preferably in the form of limestone, to the heavy crude oil prior to coking. The presence of the limestone leads to an increased yield of liquid distillates from the coking process under preferred coking conditions. Ash remaining after combustion of the coke may be leached to recover nickel and vanadium values therefrom.

1 Claim, 1 Drawing Figure

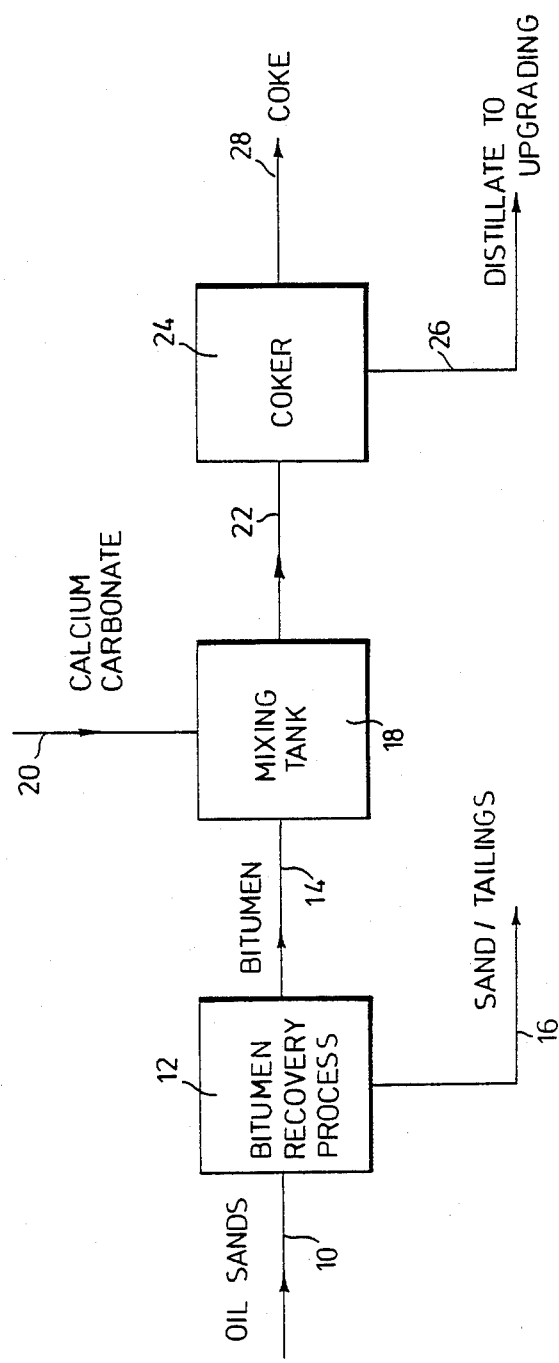

FORMATION OF COKE FROM HEAVY CRUDE OILS IN THE PRESENCE OF CALCIUM CARBONATE

FIELD OF INVENTION

The present invention is directed to the formation of improved coke in the upgrading of heavy crude oils, including bitumen recovered from oil sands.

BACKGROUND TO THE INVENTION

There are major accumulations of oil sands at a number of global locations, including Canada, United States and Venezuela. Oil sands are basically a mixture of bitumen, mineral and water of variable bitumen content. Only those surficial deposits in the Athabasca region of Alberta, Canada are being exploited on a commercial scale at this time. In the deposits, the bitumen content varies up to about 18 wt. % and averages about 12 wt. %, water is usually about 3 to about 6 wt. % and the mineral content, predominantly quartz, ranges from about 84 to about 86 wt. %.

At the present time there is one commercial procedure for the recovery of bitumen from these deposits, known as the "hot water" process, although other procedures have been suggested. The recovery procedures attempt to separate the bitumen from the oil sand. The recovered bitumen is subjected to upgrading operations to form a synthetic crude oil.

The initial step of such upgrading operation is to subject the bitumen to a coking step. The coking step involves evaporating off volatiles from the bitumen to leave a solid carbonaceous material, known as "coke". The quantity of coke formed may vary, and is usually in the range of about 10 to 25 wt. % of the bitumen.

The coke so formed has a high sulphur content, usually about 5.5 to 6 wt. %, which can be oxidized to form sulphur dioxide. The sulphur content of the coke inhibits its use as a source of thermal energy, unless elaborate and expensive sulphur dioxide removal equipment is used in association with the combustion gas stream.

Other heavy crude oils, which do not have substantial proportions of minerals associated therewith, and residua are also subjected to an initial coking step in upgrading the same, to result in sulphur-containing coke. Such heavy crude oils and residua are characterized by an API (American Petroleum Institute) gravity value of less than 25°, usually less than 20°, and occur in substantial deposits in Western Canada, California and the Orinoco Basin in Venezuela.

SUMMARY OF INVENTION

It has now been surprisingly found that the emission of sulphur dioxide on combustion of coke formed in heavy crude oil and residua upgrading can be decreased significantly, so as to enable the coke more readily to be used as a source of thermal energy. In accordance with the present invention, calcium carbonate is added to the bitumen prior to coking.

GENERAL DESCRIPTION OF INVENTION

The calcium carbonate is added to the heavy crude oil generally in powdered dry form and thoroughly intermixed therewith prior to coking. The calcium carbonate preferably is used in a natural form, such as, limestone. The ability to use a cheap and readily available material is of considerable benefit to the economics of the invention.

The presence of the additive compound in the heavy oil only affects sulphur which is present in the coke after coking and prevents the formation of sulphur dioxide therefrom upon combustion of the coke. The additive compound does not in any way affect the concentration of sulphur which is present in the liquid distillate and which must be removed during further upgrading.

The mechanism whereby the present invention is able to decrease sulphur emissions on coke combustion is theorized to be as follows. On heating during coking, the sulphur forms calcium sulphide with the calcium carbonate. Upon combustion of the coke, the calcium sulphide is oxidized to form calcium sulphate, rather than breaking down to form sulphur dioxide.

The quantity of calcium carbonate used depends on the degree of sulphur removal desired. Minor quantities are effective in achieving some decrease in the sulphur dioxide formed on combustion and the degree of decrease increases with increasing quantities of additive, until further additions confer no additional benefit. Generally, the amount of calcium carbonate used corresponds to a molar ratio of Ca:S in the oil of about 1:5 to about 1:1. It has been found that a substantial decrease of sulphur emission to an acceptable level for use in heating is attained for oil sands bitumen when the molar ratio of calcium to sulphur is about 1 to 2.

The coking may be effected in any desired manner, such as, by delayed coking or fluid coking, and at any desired temperature, although usually a temperature in the range of about 400° to 500° C. is used. It is preferred to effect the coking at a temperature of about 460° to about 480° C., since it has been found that the effect of the calcium carbonate is most effective in this range.

An additional beneficial effect has been observed when limestone or other form of calcium carbonate is added to the heavy crude oil prior to coking, in that the yield of liquid distillate from the coking is increased, as compared to the absence of calcium carbonate, when coking temperatures above 450° C. are used.

Heavy crude oils usually contain minor amounts of valuable metals, mainly nickel and vanadium. These metals are present in ash formed upon combustion of the coke. Heretofore attempts to recover such metals from the ash have been generally unsuccessful and involve complicated and expensive procedures, especially with respect to the recovery of nickel.

It has been found that when calcium carbonate is added to the heavy crude oil, the heavy crude oil is subsequently coked, and the coke is combusted, then nickel and vanadium can be extracted substantially quantitatively from the ash remaining from the combustion by leaching of the ash with hydrochloric acid. The metals then are recovered from the leach solution.

BRIEF DESCRIPTION OF DRAWING

The accompanying drawing is a schematic flow sheet of one embodiment of the procedure of the invention as applied to oil sands.

DESCRIPTION OF PREFERRED EMBODIMENT

Referring to the drawing, oil sands are fed by line 10 to a bitumen recovery process 12, such as, the hot water process, which results in bitumen in line 14 and sand and tailings for discard in line 16. The bitumen in line 14 is passed to a mixing tank 18 wherein it is intimately mixed with powdered limestone, which is fed thereto by line 20. A diluting solvent may also be added to render the bitumen more tractable.

The mixture, after recovery of any diluent solvent, is forwarded by line 22 to a coker 24 wherein volatiles are driven off and the liquid distillates are forwarded by line 26 for further upgrading to form synthetic crude oil. The coke, having a decreased tendency to form sulphur dioxide on combustion, is recovered by line 28.

EXAMPLES

Example 1

This Example illustrates the use of calcium carbonate in decreasing sulphur emissions on combustion of coke formed from oil sands bitumen.

Samples of oil sands bitumen extracted from Athabasca oil sands were mixed respectively with crushed limestone and laboratory grade calcium carbonate in amounts sufficient to provide a molar ratio of Ca:S in the bitumen of 1:2. The samples were coked at about 475° C. in a laboratory coker to form coke. Untreated samples were also coked. The volume of liquid distillates obtained was measured in each case.

The coke samples were combusted in air at about 1000° C. and the amount of sulphur dioxide emitted was determined. The results are reproduced in the following Table I:

TABLE I

| Additive | Amount Used wt. % | $SO_2$ Release from coke wt. % S | Liquid Distillates wt. % bitumen |
|---|---|---|---|
| — | — | 5.9 | 75.7 |
| Limestone | 5.9 | 1.1 | 77.8 |
| $CaCO_3$ (pure) | 6.4 | 0.7 | 77.9 |

It will be seen from the results set forth in the above Table I that addition of the limestone and pure calcium carbonate to the bitumen prior to coking lead to a substantial decrease in sulphur dioxide formation on combustion of the coke. In addition, a significant increase in liquid distillates yield was obtained when the limestone and calcium carbonate were added.

EXAMPLE II

This Example shows the effect of varying quantities of limestone on sulphur emission on coke combustion.

The procedure of Example 1 was repeated using varying quantities of limestone. The sulphur dioxide formation on combustion of coke, formed by coking at 475° C., was determined in each case. The results are reproduced in the following Table II;

TABLE II

| Limestone Addition wt. % | $SO_2$ release From Coke wt. % S |
|---|---|
| 0 | 5.8 |
| 2.1 | 3.1 |
| 4.1 | 1.8 |
| 6.0 | 1.0 |

The results of the above Table II show that there is a decrease in sulphur dioxide formation with increasing quantities of added limestone. The addition of further quantities of limestone had no appreciable effect on the quantity of sulphur dioxide released on combustion.

EXAMPLE III

This Example shows the recovery of nickel and vanadium from ash formed during combustion of the coke.

Samples of ash from the combustion at 1000° C. of coke produced at 475° C. from oil sands bitumen to which 6 wt. % limestone had previously been added, were leached with hydrochloric acid for 1 hour. One sample was leached at 75° C. using 1 molar hydrochloric acid while another sample was leached at 100° C. using 2 molar hydrochloric acid.

Attempts were also made to leach vanadium and nickel from the ash resulting from the combustion of coke resulting from commercial oil sands bitumen coking procedures and from coking of oil sands bitumen in the laboratory in the absence of added limestone. The results of the various experiments is shown in the following Table III:

TABLE III

| Ash Source | HCl Concen. | Leach Temp. | % Recovery Ni | % Recovery V |
|---|---|---|---|---|
| Laboratory + 6% limestone | 1 M | 75° C. | 50 | 98 |
| Laboratory + 6% limestone | 2 M | 100° C. | 80 | 100 |
| Laboratory (No additive) | 1 M | 75° C. | 0.6 | 36 |
| Suncor Ltd. | 1 M | 75° C. | 1.4 | 40 |
| Syncrude Ltd. | 1 M | 75° C. | 0.8 | 32 |

It will be seen from the results of the above Table III that only lower recoveries of vanadium and very low recoveries of nickel are achieved in the absence of addition of limestone to the bitumen prior to coking of the bitumen.

SUMMARY OF DISCLOSURE

In summary of this disclosure, the present invention provides a procedure for decreasing the sulphur emissive capability of coke formed heavy crude oils and residua. Modifications are possible within the scope of the invention.

What we claim is:

1. A process for the recovery of nickel and vanadium values from heavy crude oil or residua having an API gravity of less than 25° C. and sulphur, nickel and vanadium, which comprises:
   mixing calcium carbonate with said heavy crude oil or residua,
   coking the resulting mixture at a temperature of about 400° to about 500° C. to produce a coke,
   combusting said coke to form an ash,
   leaching said ash with hydrochloric acid to dissolve nickel and vanadium values therefrom, and
   recovering said nickel and vanadium values from the leach liquor.

* * * * *